(12) United States Patent
Amann

(10) Patent No.: US 8,488,132 B2
(45) Date of Patent: Jul. 16, 2013

(54) OPTOELECTRONIC POSITION MEASUREMENT DEVICE AND POSITION MEASUREMENT METHOD

(75) Inventor: Werner Amann, Feldkirch (AT)

(73) Assignee: Leica Geosystems AG, Heerbrugg (CH)

( * ) Notice: Subject to any disclaimer, the term of this patent is extended or adjusted under 35 U.S.C. 154(b) by 101 days.

(21) Appl. No.: 13/128,398

(22) PCT Filed: Nov. 20, 2009

(86) PCT No.: PCT/EP2009/065532
§ 371 (c)(1),
(2), (4) Date: Jun. 9, 2011

(87) PCT Pub. No.: WO2010/072484
PCT Pub. Date: Jul. 1, 2010

(65) Prior Publication Data
US 2011/0242548 A1  Oct. 6, 2011

(30) Foreign Application Priority Data
Dec. 15, 2008  (EP) .................................. 08171603

(51) Int. Cl.
*G01D 5/34* (2006.01)
(52) U.S. Cl.
USPC ........................................................ 356/617
(58) Field of Classification Search
USPC ........................................................ 356/617
See application file for complete search history.

(56) References Cited

U.S. PATENT DOCUMENTS

| 4,899,048 | A | * | 2/1990 | Shelander ................ 250/231.14 |
| 5,129,725 | A | * | 7/1992 | Ishizuka et al. ................ 356/617 |
| 5,760,959 | A | | 6/1998 | Michel et al. |
| 2006/0016970 | A1 | | 1/2006 | Nagasaka et al. |

FOREIGN PATENT DOCUMENTS

| CH | 522 876 | 4/1902 |
| DE | 10 2006 011540 | 8/2007 |
| GB | 2 437 396 | 10/2007 |

* cited by examiner

*Primary Examiner* — Tu Nguyen
(74) *Attorney, Agent, or Firm* — Maschoff Brennan

(57) ABSTRACT

Optoelectronic position measurement device comprises a code carrier, a radiation source and a detection unit. The code carrier can be moved relative to said sensor unit by one degree of freedom. A refractive optical element having a focusing segment and at least one neighboring segment are arranged between the code carrier and the first sensor unit. Optical radiation shining in on the focusing segment parallel or at an angle of incidence below a threshold angle α to the optical axis of the focusing segment can be guided by the focusing segment on the receiving region of the first sensor unit within the optical axis, and radiation that is shining into a deflection angle region above the threshold angle α to the optical axis of the focusing segment can be deflected by the focusing segment and the neighboring segment to a point outside of the optical axis of the focusing segment.

28 Claims, 6 Drawing Sheets

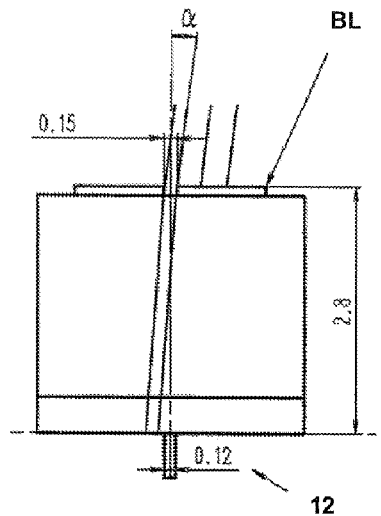
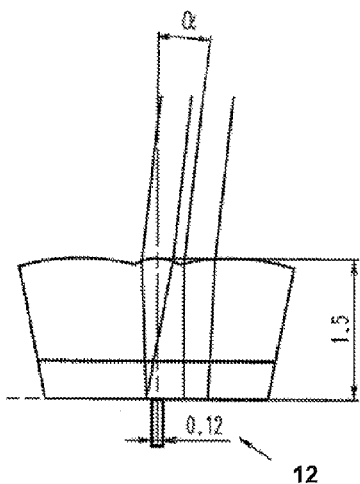
Fig.2
PRIOR ART
Fig.3
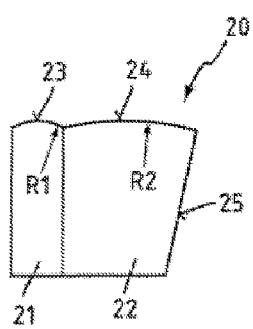
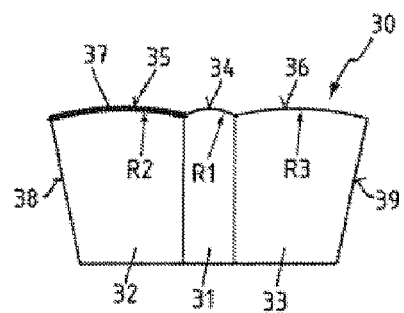
Fig.4
Fig.5

OPTOELECTRONIC POSITION MEASUREMENT DEVICE AND POSITION MEASUREMENT METHOD

FIELD OF THE INVENTION

The invention relates to an optoelectronic position measurement device and an optoelectronic position measurement method.

BACKGROUND

Methods and devices for determining the position of at least two subsystems which are moveable relative to one another have been known for a long time. One conventional approach involves the imaging of a code onto a detecting component, wherein the imaging is generally effected using optical means, such as e.g. LEDs and/or lasers. The function of position determination and, in particular, the accuracy thereof are dependent on the design and arrangement of the code and also the imaging means.

The determination of directions, angles and lengths as positions and also of distances is required in many areas of application such as, for example, geodetic and industrial measurement. Development in position measurement technology lead via mechanical reading operations to fully automated position measurement according to the current prior art.

Known scanning methods are electronic-magnetic, electronic and optoelectronic methods. The following explanations concern optoelectronic scanning devices.

Conventional optoelectronic position measurement sensors—known e.g. from DE 83 02 799 U1—for determining a distance or an angle about an axis have a code carrier and a detection unit having a multiplicity of light-sensitive receiving regions for receiving part of the optical radiation, wherein the code carrier and the detection unit are rotatable relative to one another. The optical detector is a photodetector, for example. The code carrier is embodied generally as a rod or circular disk, if appropriate also as an annulus, and carries on one side an optically detectable position code, an excerpt from which is imaged onto the detection unit by an illumination device. In general, the code carrier is embodied in a movable fashion in this case. However, it is also possible to realize an embodiment in which the code carrier is stationary and the detector moves.

CH 522 876 discloses arranging a diaphragm between the code carrier and the detection unit. It has been found, however, that such arrangements are extremely difficult to manufacture because the detection unit and the diaphragm are very small and, moreover, have to be aligned precisely with respect to one another in order that the desired radiation components are detected by the detection unit. In this case, there are conflicting requirements made of the size of the diaphragm apertures or the slot of the diaphragm, the width of the detector area and the distance between detector and diaphragm. By means of the diaphragm, obliquely incident light is shielded and, consequently, the solid angle detected by the detector is restricted. In this case, detector or pixel width and slot width and also diaphragm distance are in a mutual relationship. Given a large detector width, the slot has to be kept narrow or the diaphragm distance has to be chosen to be large, in order to bring about a corresponding restriction of the solid angle. However, a reduction of the slot width also reduces the quantity of light actually available, and an increase in the diaphragm distance enlarges the overall construction.

SUMMARY

Taking this as a departure point, the invention is based on the object of providing an improved optoelectronic position measurement device, more particularly one that is reduced in size or utilizes the quantity of light better, and a position measurement method of such a type.

A further object of the invention is to provide a position measurement device which can be produced more easily and is simplified in its construction.

Moreover, the intension is to increase the robustness of the position measurement device and to reduce the energy consumption thereof.

The optoelectronic position measurement device comprises a code carrier, which carries an optically detectable position code, a radiation source for emitting optical radiation onto the code carrier, a detection unit having at least one first sensor unit, which has at least one light-sensitive receiving region for receiving at least part of the radiation, as a result of which a scanning signal dependent on the position code can be generated and a position of the code carrier relative to the detection unit can thus be detected, and a refractive optical element, which is arranged between the code carrier and the detection unit, wherein the code carrier is moveable relative to the detection unit with one degree of freedom, more particularly rotationally or translationally.

According to the invention, the optical element has, for restricting the solid angle, an optical element having a focusing segment and at least one neighboring segment. As a result, optical radiation incident in a parallel fashion or below a limit angle with respect to the optical axis of the focusing segment is passed through the focusing segment onto the receiving region of the first sensor unit, said receiving region lying in the optical axis, and through the neighboring segment onto receiving regions of the first sensor unit that lie outside the optical axis, or a location alongside the first sensor unit. The limit angle thus defines the beginning of a deflection angle range, the functionality of which can in turn also be restricted by a second limit angle, if appropriate.

The advantage of this arrangement is that the detected light is not restricted by a diaphragm and light incident in a parallel fashion or within the permissible angle range with respect to the optical axis is focused, such that an intensity increased in comparison with a diaphragm onto the receiving regions of the first sensor unit becomes possible. Light incident from a different direction than the desired direction is focused or deflected onto receiving regions of the first sensor unit that lie outside the optical axis or onto a location alongside the first sensor unit, such that this part of the optical radiation does not influence the measurement result in a corrupting fashion and, if appropriate, can be used for further purposes, such as e.g. intensity or brightness regulation. In principle, the optical element can achieve an effect which is comparable to a diaphragm, but which has advantages over the latter. Moreover, a second limit angle can also be provided, and, in the event of said second limit angle being exceeded, light is in turn passed onto the central detection region in the optical axis by means of the neighboring segments.

Moreover, the use of such a refractive optical element permits a smaller structural height than comparable diaphragm solutions, such that the distance between sensor and code carrier can be kept small, which affords advantages both with regard to miniaturization and with regard to robustness of the arrangement.

By virtue of the focusing or beam-directing effect and the higher intensities that can thereby be generated, the light source can also be operated with low powers, which means a reduced current consumption and an increased lifetime of the light source.

In this case, it is not necessary for a receiving region actually to be arranged exactly in the focus of one of the segments.

Rather, the converging effect of the focusing is utilized. A receiving region can also be arranged parallel to the optical axis in front of or behind the focus, i.e. in a defocused fashion.

The use of the focusing optical element with the at least one auxiliary region has the effect that only optical radiation incident in the focusing segment in a parallel fashion or within the permissible angle range with respect to the optical axis reaches the receiving regions of the first sensor unit that lie in the optical axis, such that the reliability of the detection of the projection is also improved.

The dependent claims relate to advantageous embodiments and developments of the position measurement device.

Preferably, the focusing segment and the neighboring segment have curved surfaces on the side facing the code carrier, wherein the radius of curvature of the surface of the focusing segment can deviate from the radius of curvature of the surface of the neighboring segment. Such an arrangement enables improved separation of the incident light. Optical radiation which is incident outside the focusing segment, and which can nevertheless be parallel to the optical axis, is focused by the neighboring segment. In this case, the focus of the neighboring segment should preferably not coincide with the focus of the focusing segment, nor lie in the same transverse plane with respect to the optical axis as the focus of the focusing segment.

However, an alternative embodiment uses, instead of the curved outer segments, those having inwardly inclined or tilted planar areas, which, although they likewise achieve a deflecting effect, do not enable an additional focusing effect of these regions.

An optical element embodied in this way widens the distance between the radiation component that one would like to detect with the receiving regions lying in the optical axis and the other radiation components, which are incident e.g. in the neighboring segment. Consequently, the reliability of detection is increased again by this embodiment.

In accordance with a further preferred embodiment, the optical element has two neighboring segments between which the central focusing segment is arranged. Consequently, optical radiation incident on both sides of the focusing segment can be focused in directions away from the receiving regions of the first sensor unit that lie in the optical axis.

The optical element can be fixed to the detection unit, more particularly adhesively bonded or cemented onto the latter, such that the optical element can be prefabricated with the detection unit and be incorporated as an assembly into the position measurement device. During production, this obviates the additional outlay for the alignment and adjustment of the individual elements and prevents alignment errors. Furthermore, the sensor units of the detection unit are particularly small and sensitive, such that the fixing thereof to the optical element already affords protection against damage to the sensor units.

In accordance with a further preferred embodiment, the position code comprises diffractive code elements. The position code can also be composed exclusively of diffractive code elements, wherein mutually adjacent code elements differ in terms of their diffraction properties. An embodiment of the code carrier as a hologram is furthermore conceivable. By virtue of the diffractive structure of the code elements, diffraction structures are produced which have different characteristics depending on the diffractive structure chosen. What can be achieved by a suitable choice of the diffractive structure or of the grating and a corresponding arrangement of the further components of the position measurement device is that that proportion of the radiation incident on the code element which arrives on the detection unit is reduced or amplified. It is thus possible to differentiate a code element from a code element not having this structure. This identification enables the code to be recognized and evaluated in terms of its structure or sequence.

Preferably, the sensor unit is arranged on the optical element at least partly asymmetrically with respect to the optical axis. This makes it possible, inter alia, also to detect and evaluate radiation components which are incident in the focusing segment with an angle with respect to the optical axis. Such an arrangement furthermore makes it possible to detect diffracted radiation components of an n-th order maximum or minimum with the receiving regions of the first sensor unit that lie in the optical axis.

Furthermore, provision can be made of at least one second sensor unit for the detection of radiation, e.g. of a maximum or minimum generated by the diffractive code elements, wherein the second sensor unit is arranged parallel to the first sensor unit. In this way, it is possible to obtain additional information which can be used for evaluating the position information or for regulating the radiation intensity. Furthermore, this form of detection is suitable for calibrating the position measurement device.

In the case of a diffractive code, the second sensor unit can be arranged in such a way that it detects a maximum if the first sensor unit detects a minimum, and vice versa. In this way, redundancy information is obtained, for example, for the case where no or excessively weak optical radiation is detected by means of the receiving regions of the first sensor unit which lie in the optical axis. In this case, optical radiation would nevertheless be detected by means of the second sensor unit. This allows conclusions to be drawn as to whether optical radiation is incident in the optical element at all, and, if so, which code element or which type of code element diffracted said radiation. Moreover, the information provided by the second sensor unit and, if appropriate, a third sensor unit can also be included in the evaluation process, e.g. by averaging after weighting of the individual sensor contributions.

For this purpose, another embodiment provides for the detection unit to have a further sensor unit for the detection of optical radiation incident through the neighboring segment. The optical radiation detected by means of this sensor unit is additionally included in the position measurement and enables a higher accuracy of the position measurement. By way of example, the same code elements of the position code can be detected by means of the further sensor unit, but said code elements are detected with a periodic shift on account of the arrangement of the further sensor unit. Said periodic shift can be utilized to correct the position detected by means of the first sensor unit. It is also possible, by means of the methods known in the prior art, to evaluate intensity differences between the optical radiation detected by means of the first sensor unit and the optical radiation detected by means of the further sensor unit and to take account of said intensity differences algorithmically in the calculation of the position.

At least one of the sensor units comprises a linear or areal sensor array. The sensor array is composed of a multiplicity of light-sensitive receiving regions. The linear sensor array can detect optical radiation in a line, for example in the optical axis. In the case of an areal array, the receiving regions are arranged in two dimensions and serve for detecting optical radiation in an area.

Preferably, the areal sensor array is arranged in such a way that optical radiation incident through the focusing segment and through the neighboring segment can thereby be detected simultaneously. Such an embodiment allows a plurality of sensor units to be combined in a single unit. As a result, the production outlay is reduced and it is possible for the distances between the optical radiation components incident on the sensor unit to be detected more accurately and more reliably. In one development, that surface of the or of one of the neighboring segments which faces the code carrier is provided with a coating. It is particularly advantageous if the coating is spectrally selective with regard to transmission or reflection. The coating can be embodied in such a way that the optical radiation is filtered, absorbed or reflected. In this way, a diaphragm-like configuration can additionally be provided by the direct influencing of the transmitted radiation.

Alternatively, a diaphragm can be arranged between the code carrier and the optical element, said diaphragm preferably having a rectangular slot.

The part of the object concerning the method is achieved by means of an optoelectronic position measurement method for determining a position, more particularly an angle or a length, comprising the features of patent claim 12. The position measurement method comprises the following steps:

generating a projection—dependent on the position of the code carrier—of at least one part of the position code, wherein generating comprises at least emitting optical radiation onto the code carrier, detecting the projection by means of at least one first sensor unit, and deriving the position of the code carrier relative to the detection unit from the projection.

According to the invention, optical radiation incident parallel to an optical axis defined between code carrier and first sensor unit is focused onto a receiving region of the first sensor unit which lies in the optical axis, and optical radiation not incident parallel to said optical axis is deflected onto a location outside the optical axis. If a position measurement device according to the invention is used, then the focusing segment of the optical element effects the focusing onto the at least one receiving region of the first sensor unit which lies in the optical axis. In this case, the focusing brings about an increase in the radiation intensity, as a result of which the detected signals can be evaluated more reliably.

Advantageous embodiments of the method emerge from the dependent claims.

In the case of diffractive code elements, a maximum or minimum generated by said code elements is detected by means of the first sensor unit or a further sensor unit. The detection of supplementary maxima or minima makes it possible to obtain check information and—depending on embodiment and arrangement—to perform a linked evaluation. Furthermore, optical radiation incident through a neighboring segment can be detected by means of the first sensor unit or a further sensor unit even in the case of non-diffractive codes. In this way, it is possible to obtain additional information which can be evaluated algorithmically in order to calculate a position with a higher precision.

BRIEF SUMMARY OF THE FIGURES

The invention is explained in greater detail purely by way of example below on the basis of exemplary embodiments illustrated in the figures, in which:

FIG. 2 shows a detection unit with a diaphragm according to the principle of the prior art;

FIG. 3 shows an embodiment according to the invention of the detection unit for the position measurement device from FIG. 1;

FIG. 4 shows an optical element having two segments;

FIG. 5 shows an optical element having three segments;

DETAILED DESCRIPTION OF SEVERAL EMBODIMENTS

Figure 1:
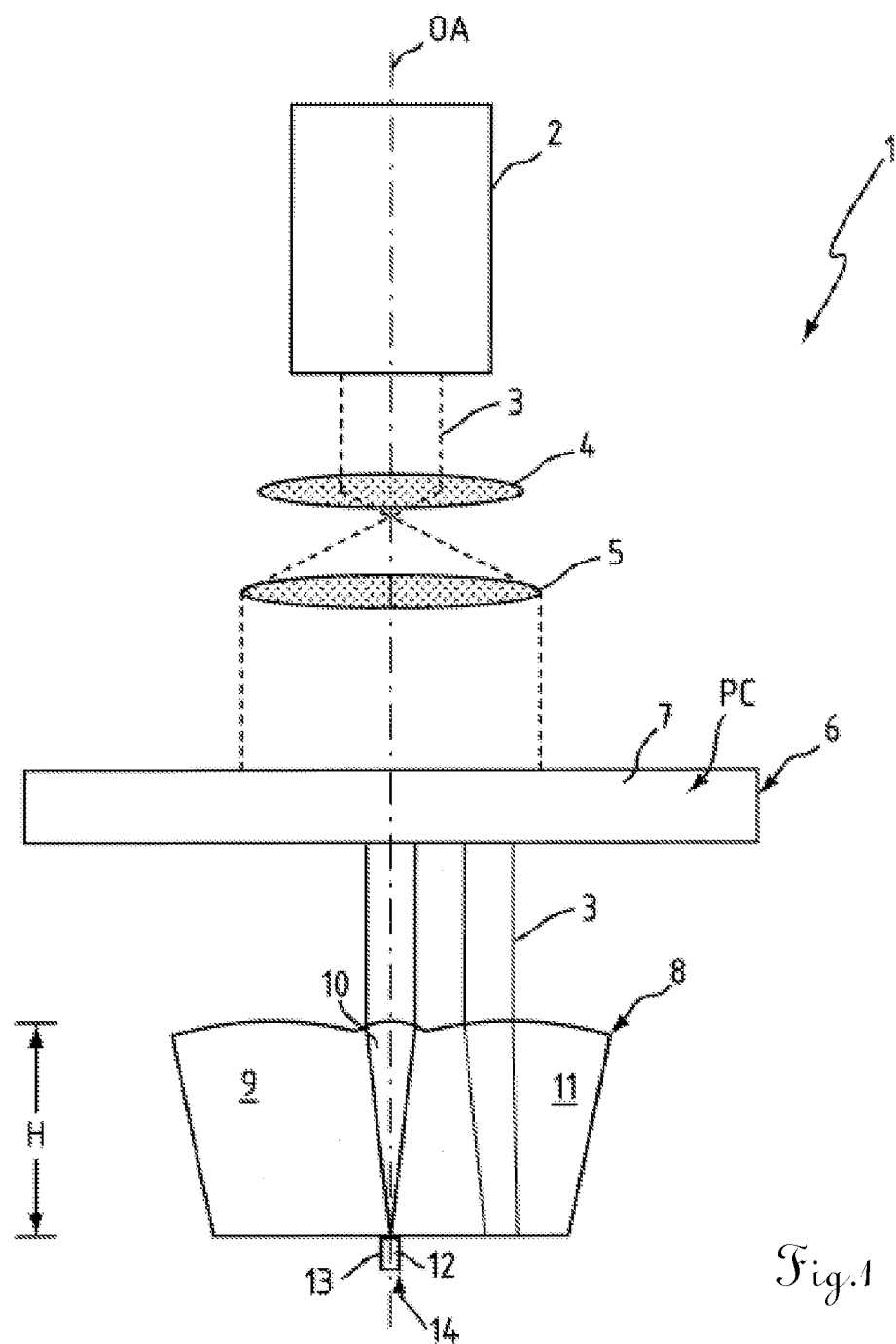
FIG. 1 shows an optoelectronic position measurement device according to the invention in a cross-sectional illustration as an excerpt.

FIG. 1 illustrates the position measurement device 1 as an excerpt. An optical radiation 3 is generated by means of an optical radiation source 2 in the form of a laser, but other sources having sufficient spatial coherence, e.g. including an LED, can also be used. The optical radiation 3 is collimated by two lenses 4, 5 and passed onto a code carrier 6, but collimation is not absolutely necessary. Thus, by way of example, it is also possible to use a slightly divergent beam.

The code carrier 6 has a position code PC having code elements, wherein this figure illustrates only one code element 7 of a first type, which is transmissive to optical radiation 3. The optical radiation 3 subsequently impinges on a refractive optical element 8 having three segments 9-11, a central focusing segment 10 and two neighboring segments 9, 11 on the left and right thereof in the plane of the figure. The optical radiation 3 is focused by the segments 9-11. The optical radiation 3 incident in a parallel fashion or with an angle of incidence below a limit angle α with respect to the optical axis OA of the focusing segment 10 is focused or directed by the focusing segment 10 onto at least one receiving region 12 of a first sensor unit 13 of the detection unit 14, said receiving region lying in the optical axis OA. In the illustration, the detection unit 14 is formed by only one sensor unit 13 having a single-line sensor array.

The neighboring segments 9, 11 of the optical element 8 are likewise embodied such that optical radiation 3 incident parallel to the optical axis OA is focused. However, said radiation is not focused or directed onto the receiving region 12 of the first sensor unit 13 which lies in the optical axis OA, such that the radiation is deflected onto a region outside the receiving region 12.

The optical element 8 is cemented onto the first sensor unit 13, but can also be held for example by a snap-action or clamping connection. Moreover, a receptacle with an immersion liquid can also be arranged between the optical element 8 and the first sensor unit 13.

In order that the receiving region 12 of the first sensor unit 13 which lies in the optical axis OA is situated at the focus of the focusing segment 10, the optical element 8 is embodied as a spacer element and has a required height H.

The effect of the optical element 8 is that the optical radiation 3 focused by the focusing segment 10 impinges with increased intensity on the receiving region 12 of the first sensor unit 13 of the detection unit 14 which lies in the optical axis OA, and the presence of optical radiation 3 can therefore be detected more reliably by means of the first sensor unit 13. A further advantage is that optical radiation 3 which impinges on the optical element 8 outside the focusing segment 10 or with an angle of incidence above the limit angle α (cf. FIGS.

10b and 10c) and thus in a deflection angle range is not focused or directed onto the receiving region 12 lying in the optical axis OA and therefore does not influence the detection. Depending on the embodiment of the code carrier 6 and the optical conditions, the receiving region 12 can also be arranged in an offset manner or asymmetrically relative to the optical axis OA.

It generally holds true here for this figure and the further examples shown that the construction in the plane of the drawing is embodied symmetrically with respect to the optical axis. That is to say that an angle of incidence of the obliquely incident light can also be negative. Perpendicularly to the plane of the drawing, by contrast, the construction is angle-independent.

FIG. 2 shows a detection unit with a diaphragm BL according to the principle of the prior art. In order, given a width of the receiving region 12 of 0.12 mm, to be able to achieve a sufficient restriction of the solid angle at sufficiently high intensities, a diaphragm BL having an opening of 0.15 mm has to be positioned at a distance of 2.8 mm above the detection region 12. In this case, the angle α designates the angle of the obliquely incident light.

In comparison with this approach, the embodiment according to the invention of the detection unit for the position measurement device, as illustrated in FIG. 3, permits a smaller structural height and higher intensities. For an identical width of the detection region 12 of 0.12 mm, it is possible to use an optical element having a height of only 1.5 mm which, moreover, has a higher intensity in the receiving region 12 by comparison with the conventional diaphragm solution from FIG. 2. In this case, the free opening of the central lens can be chosen with 0.5 mm such that approximately three times more light is utilized than in the case of a comparable diaphragm solution having a corresponding free opening of 0.15 mm.

FIG. 4 illustrates an optical element 20 having two segments 21, 22. Situated on the left in the plane of the figure is a focusing segment 21, which has a curvature having a radius R1 on a surface 23 facing the code carrier 6 (cf. FIG. 1) in the installed state. The neighboring segment 22 arranged on the right thereof in the plane of the figure likewise has a curvature on the surface 24 facing the code carrier 6, this time having the radius R2. The radius R2 of curvature is greater than the radius R1 of curvature. The neighboring segment 22 is beveled on a lateral outer side 25.

FIG. 5 illustrates a further optical element 30, which has a central focusing segment 31 and a respective neighboring segment 32, 33 on the left and right thereof in the plane of the figure. Each segment 31-33 has a surface 34-36 having a radius R1-R3 of curvature. In this case, the radius R1 of curvature of the focusing segment 31 is less than the radius R2 of curvature and the radius R3 of curvature of the neighboring segments 32, 33. In FIG. 3, the radii R2 and R3 of curvature are identical in magnitude. Depending on the concrete application, however, the radii R2 and R3 of curvature can also be different in magnitude. The neighboring segment 32 on the left in the plane of the figure is provided with a coating 37, which is spectrally selective with regard to transmission. The neighboring segments 32, 33 are beveled on the outer sides 38, 39.

Figure 6:
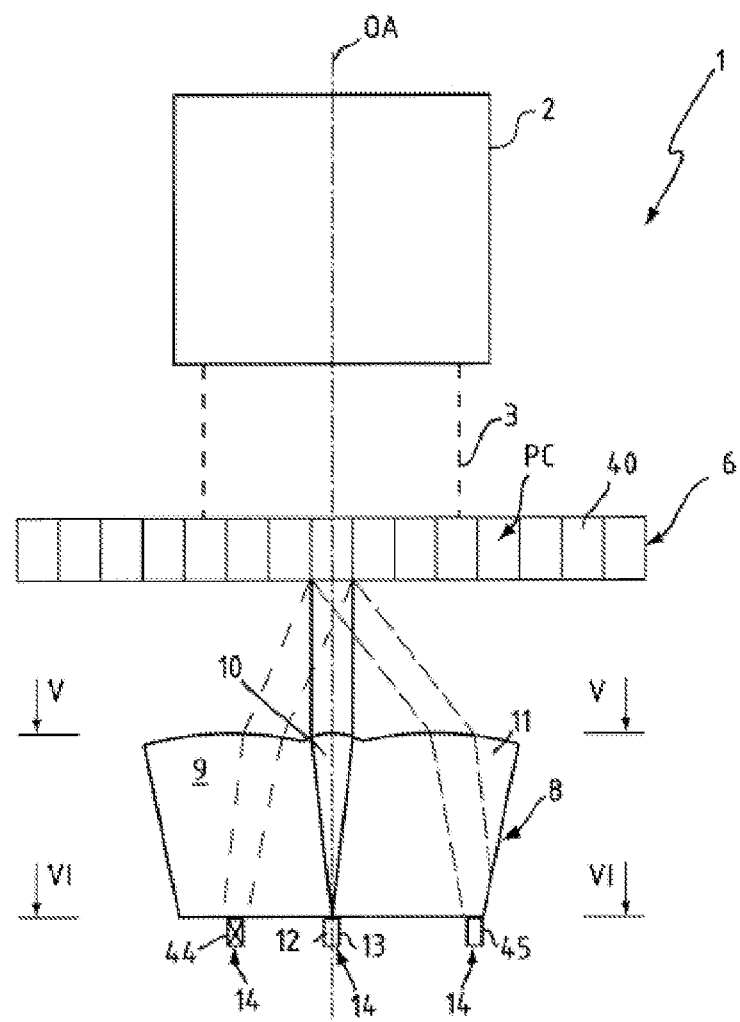
FIG. 6 shows the position measurement device in a second sectional illustration.

FIG. 6 shows the position measurement device 1 in a further sectional illustration. The radiation source 2 emits optical radiation 3 which is collimated parallel to the optical axis OA of the focusing segment 10 and impinges on the code carrier 6. FIG. 4 illustrates the code carrier 6 having a position code PC having code elements 40 of a second type. The code elements 40 of the second type have a diffractive structure that diffracts the incident radiation 3. A diffraction pattern having maxima and minima is generated by the code elements 40. If, by way of example, a minimum is situated in the optical axis OA, then this is followed toward the outside by maxima and minima which can be detected by further sensor units 44, 45 depending on positioning. In this way, the receiving regions 12 of the first sensor unit 13 which lie in the optical axis OA detect no light or light of excessively weak intensity. This generates a contrast between the code elements 7 of the first type (cf. FIG. 1) and the code elements 40 of the second type, which contrast can be evaluated for detecting a position or a position change. Alongside the first sensor unit 13, parallel thereto, two further sensor units 44, 45 are arranged on the optical element 8. Said sensor units 44, 45 detect light which is incident through the neighboring segments 9, 11. In this case, the second and third sensor units 44, 45 can be arranged parallel or in a manner obliquely offset with respect to the first sensor unit 13. In this arrangement, by way of example, the left sensor unit 44 detects a maximum 43, while the right sensor unit 45 detects a minimum 42. In this case, the beam paths illustrated should be understood as purely schematic and do not necessarily reproduce the actual size and angle relationships.

Figure 7:
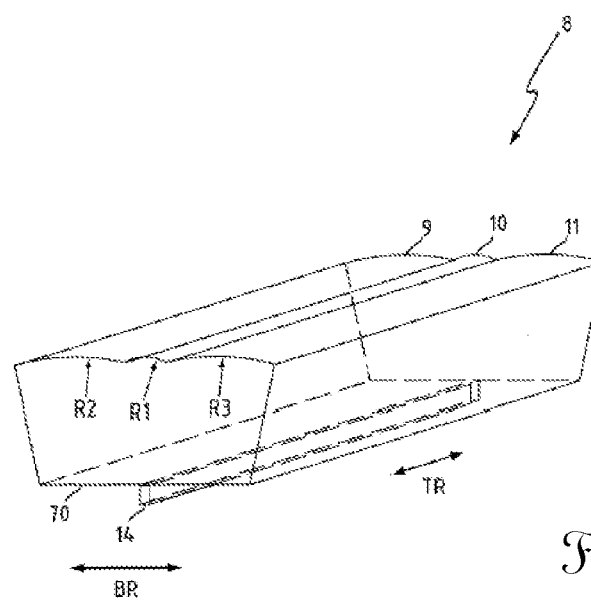
FIG. 7 shows the optical element and a detection unit in a perspective illustration.

FIG. 7 shows the optical element 8 in a perspective illustration. The optical element 8 has, as also shown in FIGS. 1 and 5, three segments 9-11: a central focusing segment 10 and two neighboring segments 9, 11 lying adjacent. The optical element 8 has a uniform cross-sectional shape in the depth direction TR. According to the invention, however, the optical element can also be embodied in rotationally symmetrical fashion. The optical element 8 also serves as a spacer element for the detection unit 14 fixed to the underside 70. In this example, said detection unit 14 is embodied as a linear sensor array and fixed to the underside 70 of the optical element 8. Depending on the area of application, however, the detection unit 14 can also be embodied as an areal sensor. In this case, the optical element 8 is adhesively bonded onto the detection unit 14.

Figure 8:
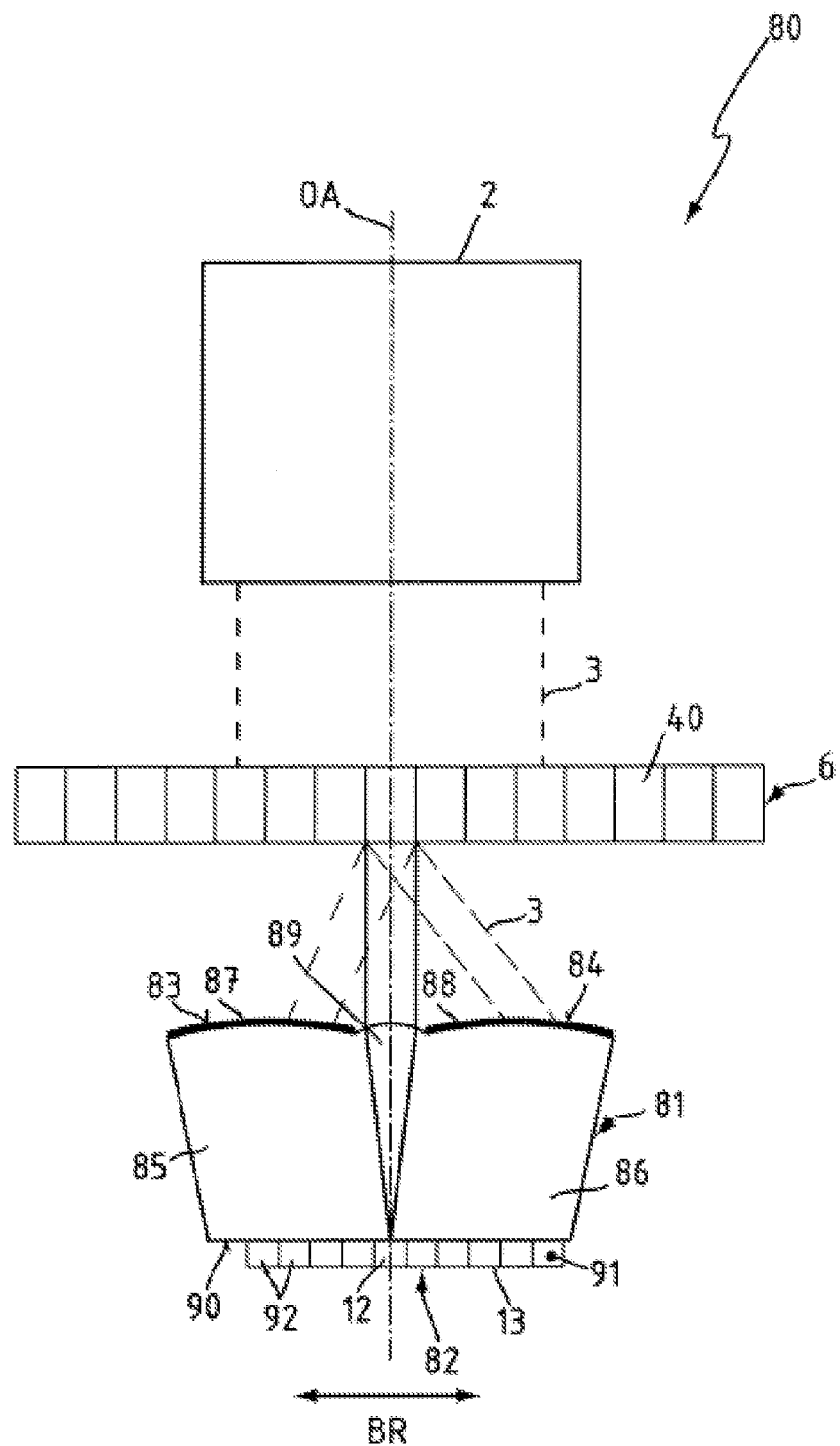
FIG. 8 shows the position measurement device with a coated optical element.

FIG. 8 illustrates an embodiment of the position measurement device 80 derived from FIG. 6. Identical features of this position measurement device 80 are therefore provided with identical reference symbols. The embodiment in FIG. 8 differs from the embodiment illustrated in FIG. 6 in the optical element 81 and in the detection unit 82, which now has a plurality of receiving regions 92. In this embodiment, a respective coating 87, 88 is applied to the curved surfaces 83, 84 of the neighboring segments 85, 86 of the optical element 81. The coating 87, 88 absorbs optical radiation 3, e.g. spectrally selectively. In this way, optical radiation 3 can be incident only in the focusing segment 89 and can be focused onto the detection unit 82. An areal sensor array 91 is fitted on the underside 90 of the optical element 81, said sensor array having a multiplicity of further receiving regions 92 extending in the width direction BR and the depth direction TR (cf. FIG. 7). While optical radiation incident on the receiving regions 12 which lie in the optical axis OA is directed, the multiplicity of further receiving regions 92 are not illuminated by the beam path of the central focusing segment 10. However, said further receiving regions 92 can be illuminated by the neighboring segments 9, 11, as is elucidated in FIG. 6, for example, but spectrally selectively, for example, on account of the coating 87, 88. For this purpose, the areal sensor array 91 can additionally be fixed to the optical element 81 asymmetrically with respect to the optical axis OA.

Figure 9:
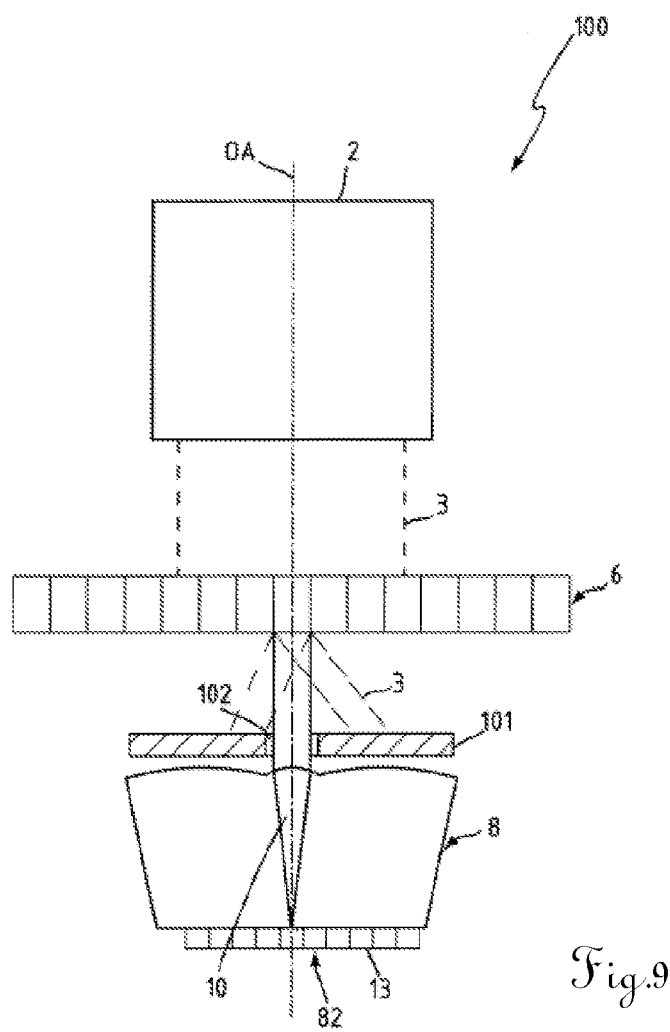
FIG. 9 shows the position measurement device with a diaphragm.

FIG. 9 illustrates a further position measurement device 100 as an excerpt. This embodiment constitutes an alternative to the position measurement device 80 illustrated in FIG. 8.

Instead of the neighboring segments 85, 86 of the optical element 81 being coated, in this embodiment an additional diaphragm 101 is arranged between the code carrier 6 and the optical element 8, said additional diaphragm having the task of shading incident optical radiation 3 that would impinge on the optical element 8 outside the focusing segment 10. In this case, the diaphragm 101 has a rectangular slot 102.

Figures 10A, 10B, 10C:
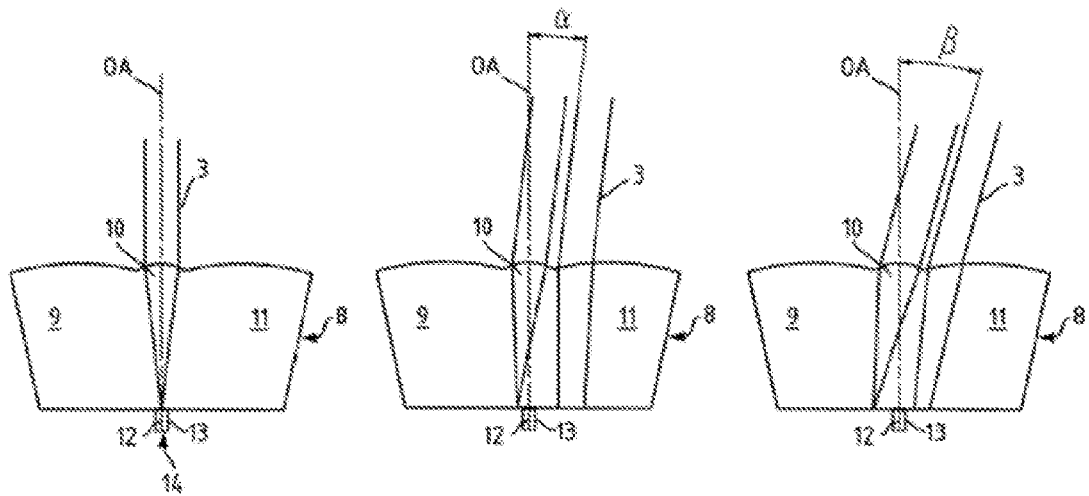
FIGS. 10*a-c* show the optical element.

FIGS. 10a to 10c illustrate how the direction of the optical radiation 3 incident in the optical element 8 is changed by the individual segments 9-11. In FIG. 10a, the optical radiation 3 impinges on the optical element 8 in a parallel fashion and thus with an angle of incidence below a limit angle α with respect to the optical axis OA. In FIG. 10b, the optical radiation 3 has the limit angle α as angle of incidence. In FIG. 10c, the angle β of incidence of the optical radiation 3 is greater than the limit angle α in FIG. 10b. As can readily be discerned in FIG. 10a, the optical radiation 3 incident in the focusing segment 10 is focused onto one or else, if appropriate, a plurality of receiving regions 12 of a first sensor unit 13 of the detection unit 14 which lie in the optical axis OA.

FIG. 10b reveals that optical radiation 3 impinging on the focusing segment 10 below the limit angle α is no longer focused or directed onto the receiving region which lies in the optical axis OA. The optical radiation 3 incident in the neighboring segment 11 is also refracted by the optical element 8 and deflected in an opposite direction, such that this part of the optical radiation 3 also does not impinge on the receiving region 12 which lies in the optical axis OA. In the case of a larger angle β of incidence of the optical radiation 3, a similar picture is manifested, as can be seen in FIG. 10c: radiation 3 incident in the focusing segment 10 is focused onto a position on the left alongside the sensor unit 13. Optical radiation 3 incident through the neighboring segment 11 likewise does not reach the sensor unit 13. In the comparison of FIGS. 10c and 10b, in the case of an angle β of incidence, the distance between the optical radiation 3 emerging from the neighboring segment 11 and the receiving region 12 of the sensor unit 13 is smaller.

While it can be sought according to the invention to deflect any incident radiation having angles of incidence above the limit angle α, this requirement does not have to be fulfilled in all cases, however, since either the corresponding angles of incidence do not occur in the first place or else the intensity of the radiation incident below these angles are negligibly low. Therefore, it usually suffices if the deflection angle range does not cover all angles above the limit angle α, but rather merely ensures the secure deflection effect up to the second limit angle β. However, in specific applications it may also be of interest also to detect radiation components from this specific angular range.

For optical reasons, the lenses in the examples illustrated are designed such that light having an angle of incidence between the limit angle α and a second limit angle β does not reach the receiving region 12 in the OA. By contrast, parallel light and light having a small angle, i.e. angle of incidence<limit angle α, impinges through the central lens on the receiving region 12 which lies in the optical axis OA. In the example specifically illustrated, light incident at a large angle, i.e. outside the deflection angle range with angle of incidence>second limit angle β, is passed through the outer lenses once again onto the receiving region 12. Consequently, the optical element 8, for reception, cuts out an angular range for the incident radiation as deflection angle range, i.e. light incident within this angular range does not reach the receiving region 12. In this case, the arrangement can, e.g. by means of a diaphragm that restricts the possible angles or a corresponding configuration of the surface curvature of the neighboring segments 9 or 11, also be designed, however, such that reception is actually excluded at angles of incidence>limit angle α.

In the case of diffractive circular graduations or codes, however, the use of deflection angle ranges with a lower and an upper limit angle, i.e. the limit angles α and β, allows a technically simple design. This is possible since, in these diffractive applications, usually almost no light having angles of incidence greater than β occurs. In the case of the diffractive circle for which this optical element is primarily designed, the higher diffraction orders have to be masked out. The even (zeroth, second, . . . ) diffraction orders supply no light anyway and, in the case of the odd diffraction orders, light is present only in the first and third diffraction orders. All higher, i.e. above the third diffraction order, orders contribute practically almost no more radiation components. Since the optical system can be designed in a simple manner with a second limit angle β such that the first and third diffraction orders have an angle between α and β, they are deflected from the receiving region 12. In this respect, the lower limit angle α is predominantly relevant to the functionality according to the invention just as long as the diffraction angle range is large enough also to reliably deflect the third diffraction order.

Figure 11:
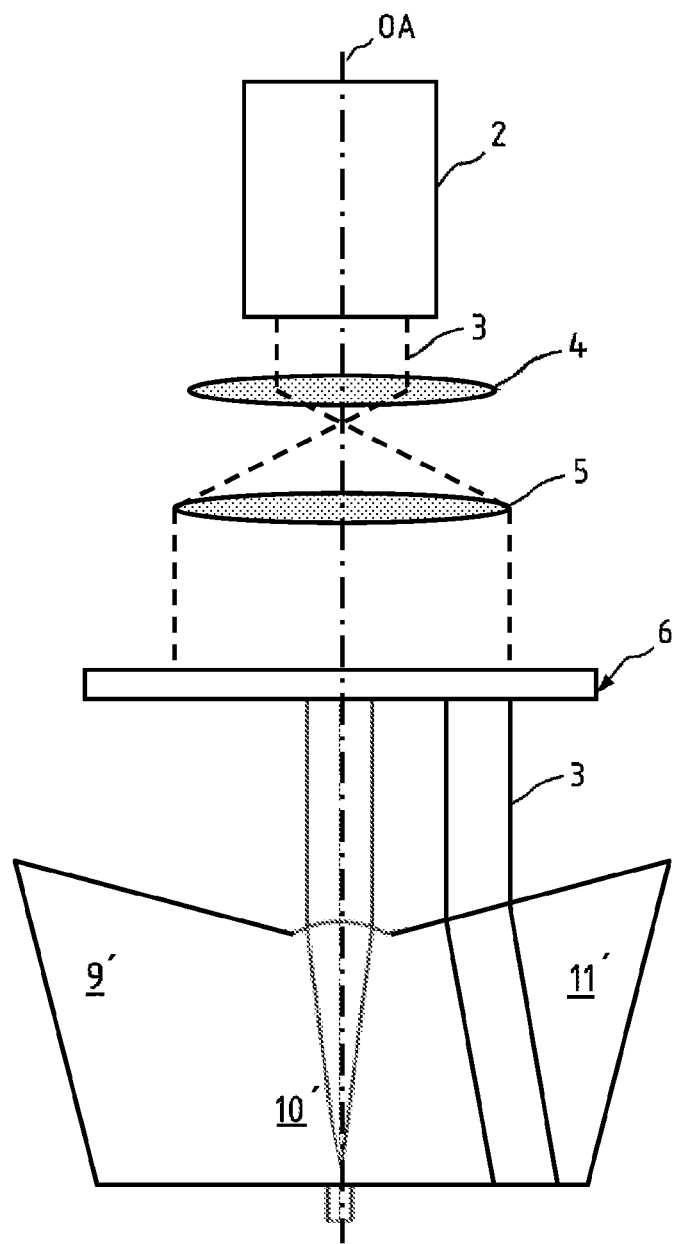
FIG. 11 shows a further optoelectronic position measurement device according to the invention with an optical element having two wedge-shaped outer segments.

FIG. 11 shows a further optoelectronic position measurement device according to the invention having an optical element having two wedge-shaped outer segments. In this case, in terms of the arrangement of the components and the beam path, the construction corresponds to the position measurement device illustrated in FIG. 1. However, the optical element is configured in a deviating manner, wherein the focusing segment 10' has a curved surface on the side facing the code carrier 6 and the neighboring segment 9', 11' has a surface rising outwardly in a wedge- or prism-shaped manner on the side facing the code carrier 6. In this case, this arrangement corresponds to the arrangement of FIG. 1, wherein the outer segments are formed with an outwardly rising planar surface. Therefore, the optical passage areas of the wedges or prisms face toward the optical axis OA, or the plane defined by these areas is inclined toward the optical axis OA. Therefore, on account of the orientation of their planar area, these wedge segments likewise have an outwardly deflecting effect, although no additional focusing effect occurs. In both cases, such a deflecting effect is achieved by means of the configuration or orientation—inclined relative to the optical axis OA—of the impingement region of the radiation to be deflected. In the case of the curved surface, the inclination angle is continuously varied here, whereas in the planar case the inclination angle of the area relative to the optical axis OA remains the same at all points of the area.

The features of the different embodiments illustrated are specified by way of example in the respective assignment and can also be combined with other embodiments. Thus, e.g. the additional diaphragm or the immersion liquid can be used in all embodiments and alongside the first sensor unit also for the further sensor units. Moreover, alongside diffractive codes, it is equally possible to use various other code variants, e.g. with a pure shading effect, for all of the embodiments. Finally, according to the invention, an optical element having only two or more than three neighboring segments can also be used according to the invention in all of the embodiments. The embodiments illustrated should accordingly be understood as purely by way of example.

What is claimed is:

1. An optoelectronic position measurement device, comprising:
   a code carrier, which carries an optically detectable position code;

a radiation source for emitting optical radiation onto the code carrier;

a detection unit having at least one first sensor unit, which has at least one light-sensitive receiving region for receiving at least part of the radiation, as a result of which a scanning signal dependent on the position code can be generated and a position of the code carrier relative to the first sensor unit can thus be detected; and a refractive optical element, which is arranged between the code carrier and the first sensor unit and has a focusing segment and at least one neighboring segment, wherein:

radiation incident in a parallel fashion or with an angle of incidence below a limit angle $\alpha$ with respect to the optical axis of the focusing segment can be directed by the focusing segment onto the receiving region of the first sensor unit, said receiving region lying in the optical axis;

radiation incident with an angle of incidence in a deflection angle range above the limit angle $\alpha$ with respect to the optical axis can be deflected by the focusing segment and the neighboring segment onto a location outside the optical axis;

the code carrier is moveable relative to the first sensor unit with one degree of freedom;

the focusing segment and the neighboring segment have curved surfaces on the side facing the code carrier; and the radius of curvature of the surface of the focusing segment deviates from the radius of curvature of the surface of the at least one neighboring segment.

2. An optoelectronic position measurement device according to claim 1, wherein the code carrier is moveable relative to the first sensor unit rotationally or translationally.

3. The position measurement device as claimed in claim 1, wherein the optical element has two neighboring segments between which the central focusing segment is arranged.

4. The position measurement device as claimed in claim 1, wherein the optical element is fixed to the first sensor unit and/or detection unit, more particularly adhesively bonded thereon, held thereon by a snap-action or clamping connection, or cemented thereon.

5. The position measurement device as claim in claim 1, wherein a receptacle with an immersion liquid is arranged between the optical element and the first sensor unit.

6. The position measurement device as claimed in claim 1, wherein the sensor unit is arranged in a manner offset with respect to the optical axis.

7. The position measurement device as claimed in claim 1, further composing at least one second sensor unit for detecting a light distribution generated by diffractive code elements, wherein the second sensor unit is arranged parallel or in a manner obliquely offset with respect to the first sensor unit.

8. The position measurement device as claimed in claim 1, wherein at least one of the sensor units has a linear or areal sensor array.

9. The position measurement device as claimed in claim 1, wherein a surface of the at least one neighboring segment that faces the code carrier has a coating.

10. The position measurement device as claimed in claim 9, wherein the coating is spectrally selective with regard to transmission, absorption or reflection.

11. The position measurement device as claimed in claim 1, wherein a diaphragm is arranged between the code carrier and the optical element.

12. The position measurement device as claimed in claim 1, wherein:

the deflection angle range is delimited by a second limit angle $\beta$; and radiation incident with an angle of incidence above the limit angle $\beta$ with respect to the optical axis can be directed onto the receiving region of the first sensor unit, said receiving region lying in the optical axis.

13. An optoelectronic position measurement device, comprising:

a code carrier, which carries an optically detectable position code;

a radiation source for emitting optical radiation onto the code carrier;

a detection unit having at least one first sensor unit, which has at least one light-sensitive receiving region for receiving at least part of the radiation, as a result of which a scanning signal dependent on the position code can be generated and a position of the code carrier relative to the first sensor unit can thus be detected; and a refractive optical element, which is arranged between the code carrier and the first sensor unit and has a focusing segment and at least one neighboring segment, wherein:

radiation incident in a parallel fashion or with an angle of incidence below a limit angle a with respect to the optical axis of the focusing segment can be directed by the focusing segment onto the receiving region of the first sensor unit, said receiving region lying in the optical axis;

radiation incident with an angle of incidence in a deflection angle range above the limit angle $\alpha$ with respect to the optical axis can be deflected by the focusing segment and the neighboring segment onto a location outside the optical axis;

the code carrier is moveable relative to the first sensor unit with one degree of freedom, more particularly rotationally or translationally;

the focusing segment has a curved surface on the side facing the code carrier; and the neighboring segment has an outwardly rising planar surface on the side facing the code carrier.

14. An optoelectronic position measurement device according to claim 13, wherein the code earner is moveable relative to the first sensor unit rotationally or translationally.

15. The position measurement device as claimed in claim 13, wherein the optical element has two neighboring segments between which the central focusing segment is arranged.

16. The position measurement device as claimed in claim 13, wherein the optical element is fixed to the first sensor unit and/or detection unit, more particularly adhesively bonded thereon, held thereon by a snap-action or clamping connection, or cemented thereon.

17. The position measurement device as claimed in claim 13, wherein a receptacle with an immersion liquid is arranged between the optical element and the first sensor unit.

18. The position measurement device as claimed in claim 13, wherein the sensor unit is arranged in a manner offset with respect to the optical axis.

19. The position measurement device as claimed in claim 13, further comprising at least one second sensor unit for detecting a light distribution generated by diffractive code elements, wherein the second sensor unit is arranged parallel or in a manner obliquely offset with respect to the first sensor unit.

20. The position measurement device as claimed in claim 13, wherein at least one of the sensor units has a linear or areal sensor array.

21. The position measurement device as claimed in claim 13, wherein a surface of the at least one neighboring segment that faces the code carrier has a coating.

22. The position measurement device as claimed in claim 21, wherein the coating is spectrally selective with regard to transmission, absorption or reflection.

23. The position measurement device as claimed in claim 13, wherein a diaphragm is arranged between the code carrier and the optical element.

24. The position measurement device as claimed in claim 13, wherein:
- the deflection angle range is delimited by a second limit angle $\beta$; and
- radiation incident with an angle of incidence above the limit angle $\beta$ with respect to the optical axis can be directed onto the receiving region of the first sensor unit, said receiving region lying in the optical axis.

25. An optoelectronic position measurement method for determining a position of a first sensor unit with respect to a code carrier being moveable relative to the first sensor unit and having a position code for use with a position measurement device, comprising:
- generating a projection—dependent on the position of the code carrier—of at least one part of the position code, wherein generating comprises at least emitting optical radiation onto the code carrier;
- detecting the projection by means of at least the first sensor unit; and
- deriving the position of the code carrier relative to the first sensor unit from the projection, wherein:
  - optical radiation incident in a parallel fashion or with an angle of incidence below a limit angle $\alpha$ with respect to an optical axis defined by a focusing segment as a part of a refractive optical element arranged between code carrier and first sensor unit, the focusing segment having a curved surface on the side facing the code carrier, is directed by the focusing segment onto a light-sensitive receiving region of the first sensor unit, said receiving region lying in the optical axis; and
  - optical radiation incident with an angle of incidence in a deflection angle range above the limit angle $\alpha$ with respect to said optical axis is deflected by the focusing segment and a neighboring segment of the refractive optical element onto a location outside the receiving region;
  - a scanning sign dependent on the position code is generated; and
  - a position of the code carrier relative to the first sensor unit is determined.

26. The position measurement method as claimed in claim 25, wherein a light distribution pattern generated by diffractive code elements of the position code is detected by means of the first sensor unit or some other sensor unit.

27. The position measurement method as claimed in claim 26, wherein optical radiation incident through a neighboring segment is detected by means of the first sensor unit or a further sensor unit.

28. The position measurement method as claimed in claim 25, wherein the position code includes an angle or a length for use with a position measurement device.

\* \* \* \* \*